US008239506B2

(12) United States Patent  (10) Patent No.: US 8,239,506 B2
Danforth et al. (45) Date of Patent: Aug. 7, 2012

(54) SYSTEM AND METHOD FOR AFFECTING THE BEHAVIOR OF A NETWORK DEVICE IN A CABLE NETWORK

(75) Inventors: Andrew Danforth, Herndon, VA (US); William Webb, Winchester, VA (US); Michael Dillon, Manassas, VA (US)

(73) Assignee: Time Warner Cable, Inc., New York, NY (US)

( * ) Notice: Subject to any disclaimer, the term of this patent is extended or adjusted under 35 U.S.C. 154(b) by 183 days.

(21) Appl. No.: 12/424,154

(22) Filed: Apr. 15, 2009

(65) Prior Publication Data

US 2009/0198804 A1 Aug. 6, 2009

Related U.S. Application Data

(62) Division of application No. 10/913,970, filed on Aug. 6, 2004, now Pat. No. 7,571,460.

(51) Int. Cl.
G06F 15/177 (2006.01)
G06F 17/00 (2006.01)
(52) U.S. Cl. .......................................... 709/221; 726/1
(58) Field of Classification Search .................. 709/221; 726/1
See application file for complete search history.

(56) References Cited

U.S. PATENT DOCUMENTS

| 5,020,129 | A | 5/1991 | Martin et al. | |
|---|---|---|---|---|
| 5,887,141 | A * | 3/1999 | Trugman | 709/227 |
| 6,160,843 | A | 12/2000 | McHale et al. | |
| 6,952,428 | B1 * | 10/2005 | Necka et al. | 370/466 |
| 7,007,080 | B2 | 2/2006 | Wilson | |
| 7,072,800 | B1 * | 7/2006 | Fernandez et al. | 702/186 |
| 7,099,338 | B1 * | 8/2006 | Lee | 370/401 |
| 7,290,054 | B2 | 10/2007 | Stoner et al. | |
| 7,836,501 | B2 * | 11/2010 | Sobel et al. | 726/22 |
| 2003/0046706 | A1 | 3/2003 | Rakib | |
| 2003/0115482 | A1 | 6/2003 | Takihiro et al. | |
| 2004/0001478 | A1 | 1/2004 | Wong | |
| 2004/0088734 | A1 | 5/2004 | Donlan et al. | |
| 2005/0267954 | A1 * | 12/2005 | Lewis et al. | 709/221 |
| 2006/0130139 | A1 * | 6/2006 | Sobel et al. | 726/22 |

* cited by examiner

Primary Examiner — Peling Shaw
Assistant Examiner — Thomas Richardson
(74) Attorney, Agent, or Firm — The Marbury Law Group, PLLC

(57) ABSTRACT

A subscriber access control system (SACS) configures a network device connected to cable network to affect the behavior of that device. The SACS comprises a rules engine and a datastore that stores the current state of subscribers known to the SACS and historical request information. When the SACS receives a request to quarantine a device, it assigns attributes to a subscriber record accessed by a DHCP server to affect the configuration and behavior of that device. The actual behavior of the quarantined device is determined by the presence of the attribute and the value of the attribute.

16 Claims, 8 Drawing Sheets

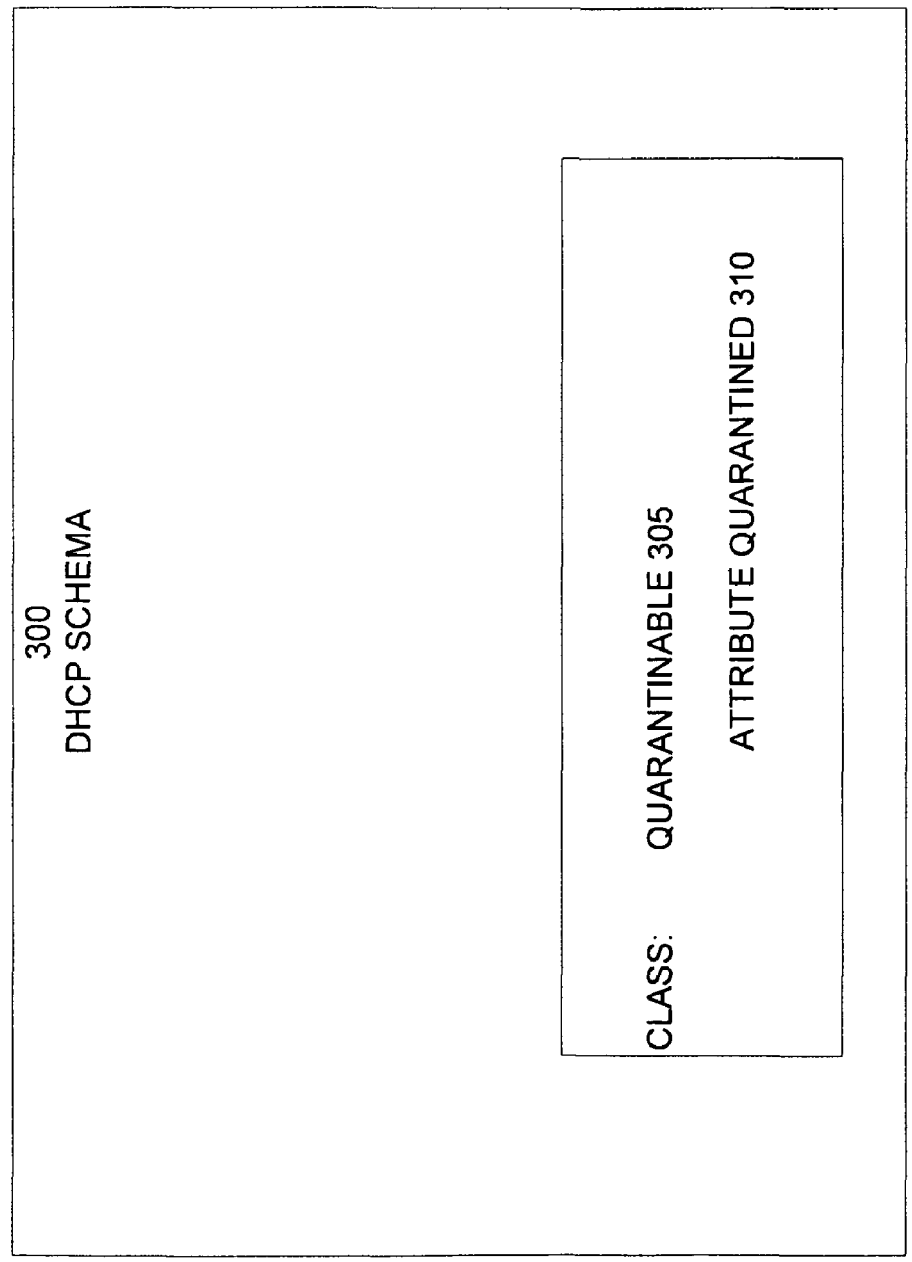

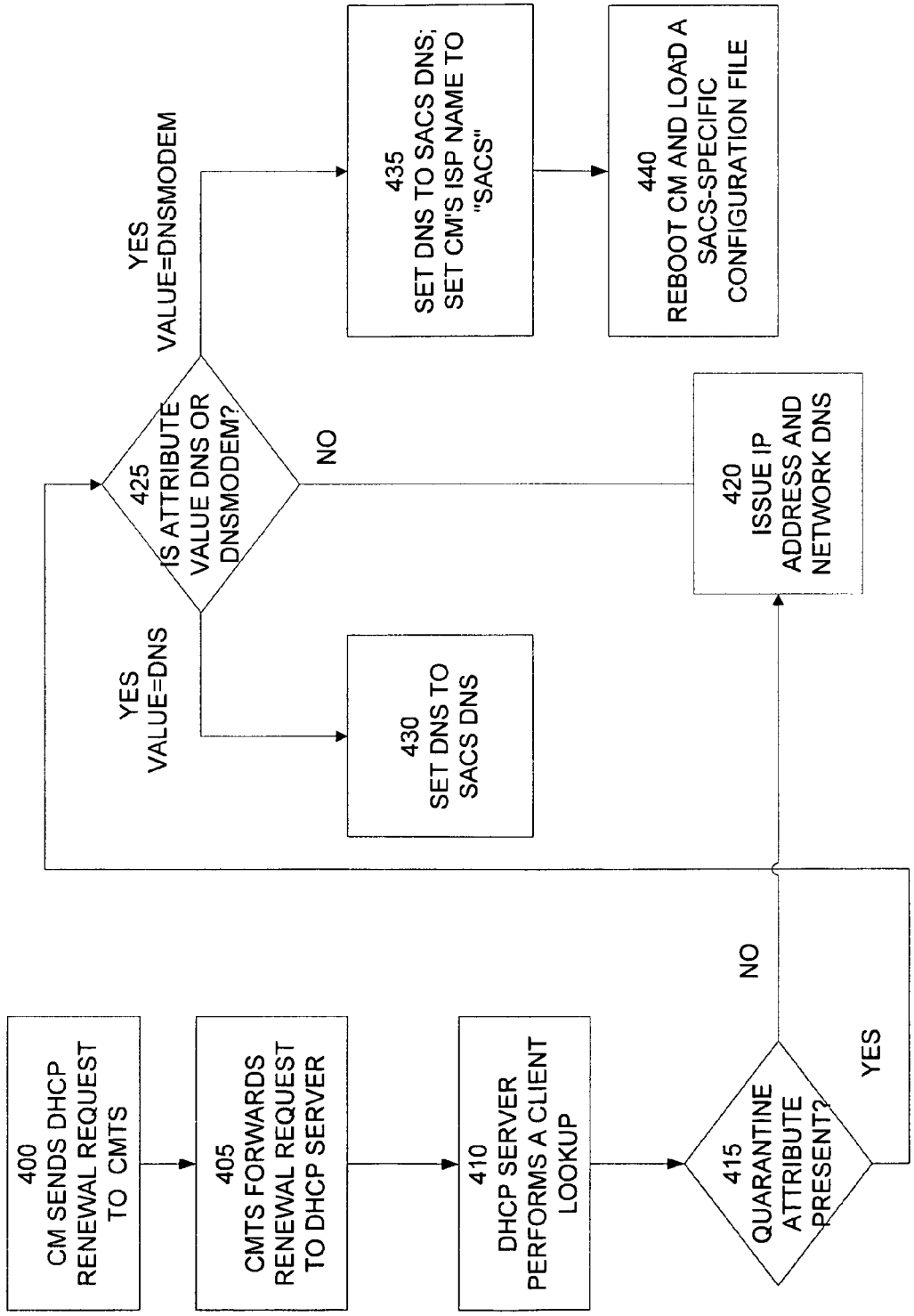

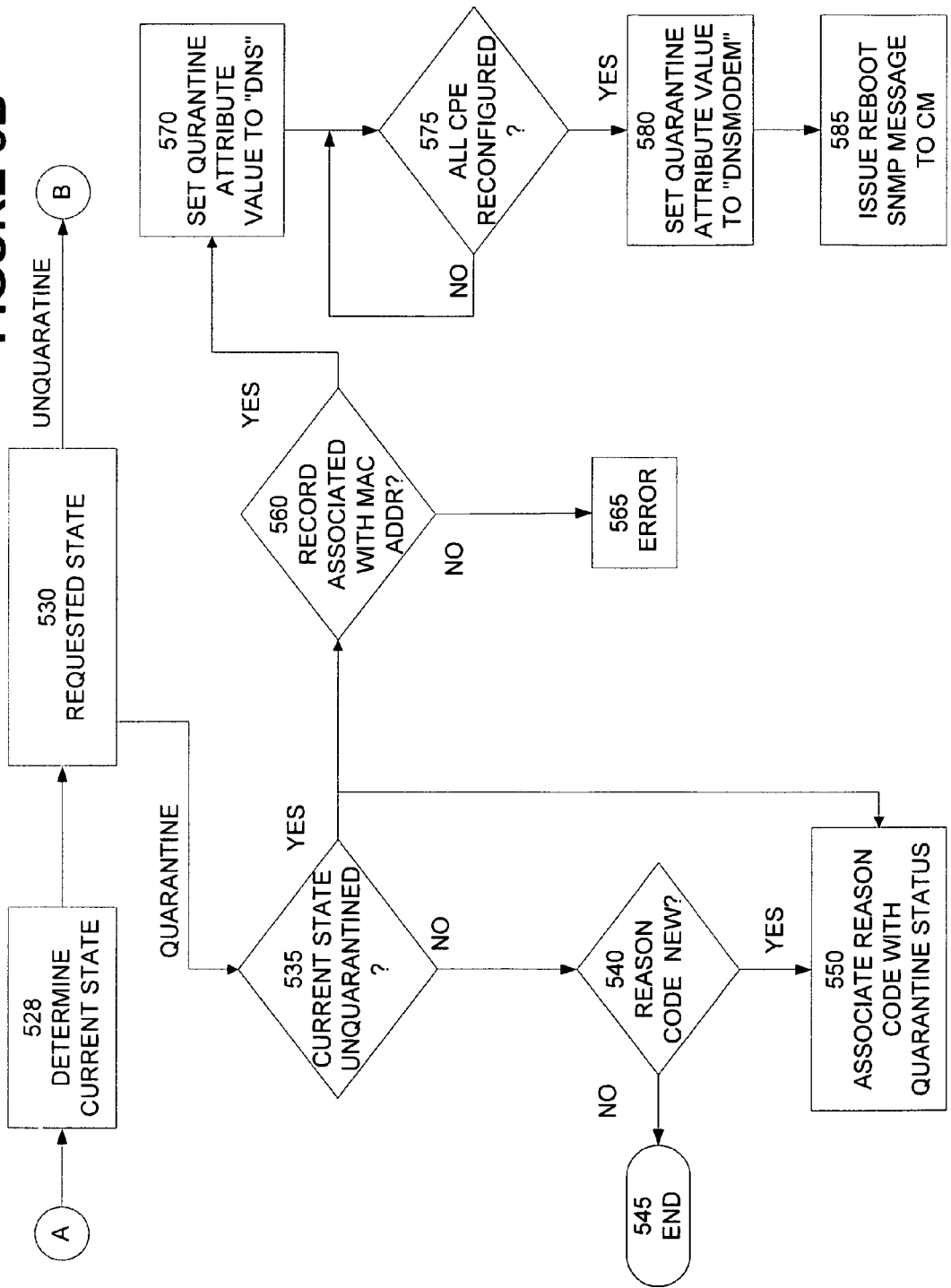

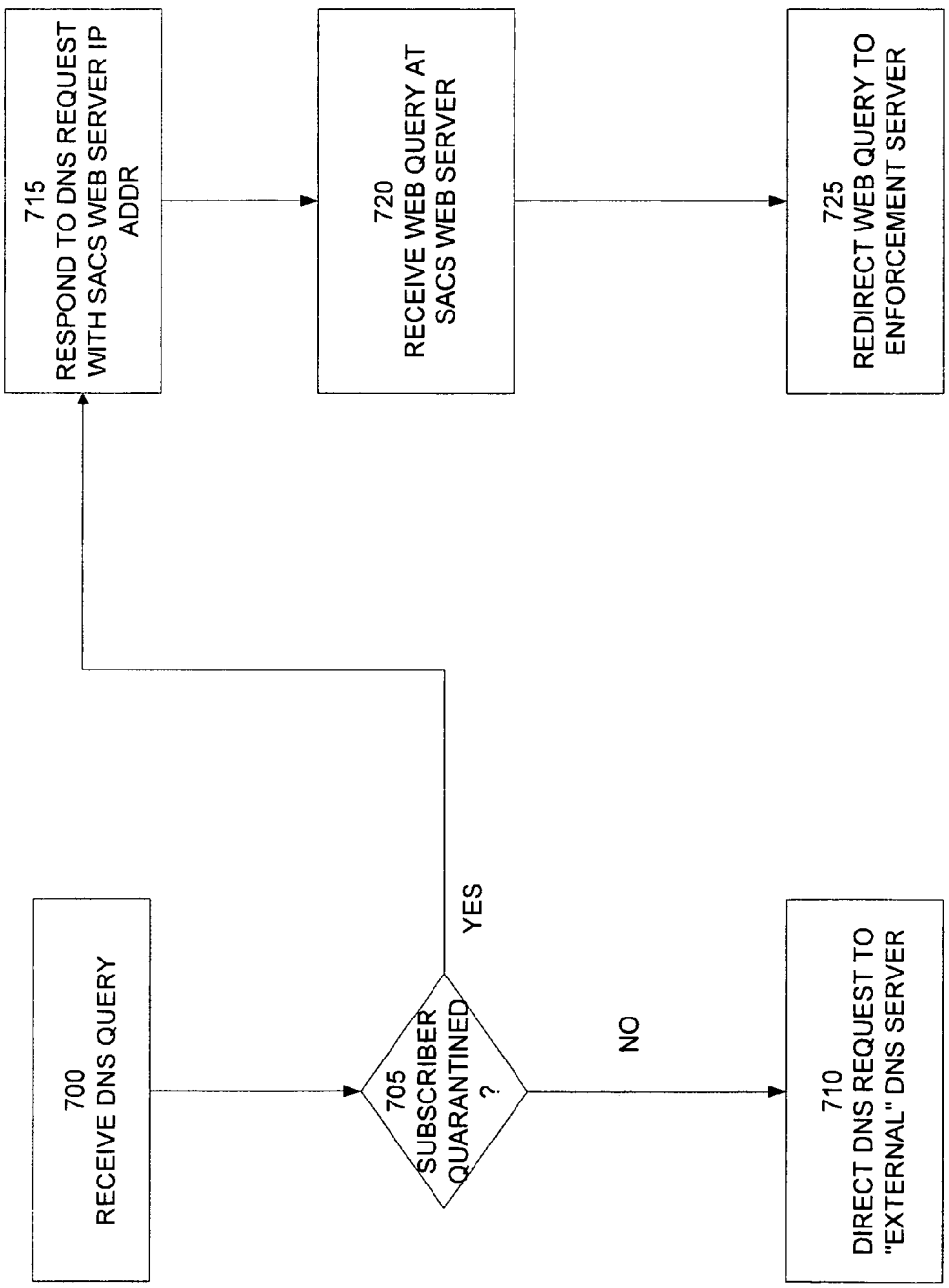

SYSTEM AND METHOD FOR AFFECTING THE BEHAVIOR OF A NETWORK DEVICE IN A CABLE NETWORK

RELATIONSHIP TO OTHER APPLICATIONS

This application is a divisional application of U.S. application Ser. No. 10/913,970, filed Aug. 6, 2004 now U.S. Pat. No. 7,571,460, which application is incorporated by reference for all purposes and from which priority is claimed.

BACKGROUND

Embodiments of the present invention generally relate to the management of cable network usage, and in particular to affecting the behavior of a cable network device associated with a subscriber.

The Internet, sometimes referred to as the information superhighway, comprises a vast assortment of interconnected networks. Private network operators increasingly provide access to the Internet to subscribers who pay a fee for use of the provider's equipment and infrastructure. Some of these providers, such as cable network operators, offer additional services over the private network to their subscribers.

Operation of a subscriber network requires not only facilities to establish communications but resources to manage the network. Individual subscribers represent both a business opportunity and, if abusing the network or their service commitments, a threat to the network. Managing subscribers and their use of the various network resources is therefore a way to maximize the financial return from the subscriber base and to protect the network. Examples of subscriber management activities include managing new activations, isolation and cleansing of virus-spreading subscribers, compelling subscribers to upgraded service-related software, isolating and managing a subscriber who is abusing the network or exceeding the service resources available to that subscriber, and offering a subscriber a new tier of service.

It is not unusual for a network operation to impose bandwidth limits, outbound limits on e-mail, and limits on DNS queries for example. Clearly, a subscriber network operator has an interest in minimizing the affects of viruses on its subscribers and preventing the spread of a virus from infected subscribers. Additionally, operators of subscriber networks are motivated to market new or upgraded services to subscribers, preferably on a personalized basis. The problem today is that subscriber management is largely a manual exercise that is both time consuming, resource intensive, and subject to errors in data entry.

Cable systems interact with subscribers on an automated basis during the auto-provisioning process. A dynamic TFTP (DTFTP) server is described in U.S. patent application entitled, "System And Method For Provisioning A Network Device With A Dynamically Generated Boot File Using A Server," filed Jul. 14, 2003 (Ser. No. 10/619,236; now U.S. Pat. No. 7,293,078). A system and method for updating and synchronizing changes made to provisioning parameters used by a DTFTP server and a CMTS supported by that DTFTP server is described in U.S. patent application entitled, "System And Method For Managing Provisioning Parameters In A Cable Network," filed on Jul. 14, 2003 (Ser. No. 10/619,262; now U.S. Pat. No. 7,376,718). Both the 10/619,236 application and the 10/619,262 application are incorporated herein by reference for all purposes. During the provisioning process, a device that requires provisioning (e.g., a cable modem) is validated as authorized for connection to the cable system (based on the device MAC address) and provided a boot-file that establishes the device level of service, identification codes, and network address. Customer premises equipment, such as a computer or a media terminal adapter, that is connected to the cable modem is also identified and configured. While provisioning can establish usage limits and other operational constraints on a subscriber, once provisioning has been completed there is no convenient way to reconfigure a network device used by a subscriber to affect the behavior of that device without removing the device from the network.

What would be useful is a system and method for affecting the behavior of a network device in a cable network environment to effectuate both marketing and network protection objectives.

SUMMARY

An embodiment of the present invention uses a subscriber access control system (SACS) to configure a network device connected to cable network and to affect the behavior of that device. The SACS comprises a rules server and a datastore that stores the current state of subscribers known to the SACS and historical request information. When the SACS receives a request to quarantine a device, the SACS obtains the MAC address and IP of the device to be quarantine, determines the quarantine "state" of the subscriber, and then assigns attributes to a subscriber record accessed by a DHCP server to affect the behavior of that device. The actual behavior of the quarantined device is determined by the presence of the attribute and the value of the attribute.

In an exemplary embodiment of the present invention, a network device of a subscriber is quarantined (or isolated) from all or a portion of a cable network. In this exemplary embodiment, the behavior of the quarantined device is modified to direct communications from the device to an enforcement server. A subscriber using the quarantined network device (a "quarantined subscriber") is presented with the reasons for the quarantine and the steps necessary to release the subscriber's network equipment from quarantine.

It is therefore an aspect of the present invention to control the behavior of a network device connected to a cable network by adjusting the configuration of that device to affect a desired behavior.

It is another aspect of the present invention to isolate a network device from all or part of a cable network in order to direct information to that device or the subscriber using that device.

It is yet another aspect of the present invention to protect a cable network from misuse by subscribers.

It is still another aspect of the present invention to provide to a cable operator a mechanism for enforcing network rules applicable to subscribers.

It is an aspect of the present invention to direct an isolated network device to a network resource that can facilitate the detection and correction of a computer virus.

It is another aspect of the present invention to direct an isolated network device to a network resource where service-related software may be upgraded.

It is yet another aspect of the present invention to direct an isolated device to a network resource where the device may be reconfigured to receive an upgraded service.

These and other aspects of the present invention will become apparent from a review of the general and detailed descriptions that follow.

An exemplary embodiment of the present invention uses a subscriber access control system (SACS) to quarantine a network device associated with a subscriber of a cable system. A computer (CPE) generates messages that are sent via a cable modem (CM) for processing by a CM termination system (CMTS). The CPE and CM are "known" to the CMTS through a configuration process that is generally described in standards issued by Cable Television Laboratories, Inc. (including, but not limited to the Data-over-Cable Interface Specifications (DOCSIS®), and PacketCable™) and further described below. In this embodiment, the CPE used by a subscriber is "quarantined" by assigning an alternate DNS server to the subscriber's CPE through the DHCP IP address assignment process. This alternate DNS server returns the IP address of the SACS for every DNS lookup. When a quarantined CPE attempts to access a website, the CPE is directed to an enforcement server. In another embodiment of the present invention, a cable modem is caused to reboot and to acquire a SACS-specific DOCSIS configuration (or boot) file. The SACS-specific DOCSIS configuration file comprises IP filters that control access to the Internet at large.

In an alternative embodiment of the present invention, a determination is first made whether the subscriber is configured to receive VoIP telephone service and, if so configured, whether a call is in progress. If a call is in progress, the subscriber's modem is not rebooted until the call is terminated. Similarly, a subscriber may be configured to receive other multimedia services via an MTA. Prior to rebooting the subscriber's CM, a determination is made whether a multimedia session is in progress. If so, the subscribers modem is not rebooted until the multimedia session is completed.

The enforcement server comprises all of the quarantine-related content that is displayed for quarantined subscribers. The SACS redirects a quarantined CPE to a particular enforcement server appropriate to deal with the reason or reasons that the subscriber's CPE was quarantined. A subscriber associated with the quarantined CPE is provided an explanation of the reason or reasons that the CPE was quarantined. The enforcement server manages the content of the reason code text provided to quarantined subscribers. In an embodiment of the present invention, the information provided to a subscriber is customized for that subscriber based on the knowledge of the subscriber's account information.

The quarantine process may be applied to CPE other than a computer. For example, if the CPE is an MTA configured for VoIP services, the MTA may be configured so that when a telephone is "off-hook," the MTA is directed to an enforcement call management system (CMS) that provides the subscriber a voice message. The voice message can convey information regarding the quarantine to the subscriber via recorded messages. By way of illustration and not as a limitation, a voice message would inform the subscriber of the reason or reasons for the quarantine (need to update software, availability of new services, failure to pay bill, violation of service rules, etc.) and what the subscriber must do to lift the quarantine.

In an embodiment of the present invention, a SACS accepts formatted input (customer identifier, reason code, timestamp) from other external systems, either automatic or manual, to place a network device into/out of quarantine as specified. The external system issues a "quarantine request" and provides a "reason code" which is used by the SACS system to classify the reason for the quarantine and ensure that the subscriber is provided with the reasons for the quarantine and the steps necessary to lift the quarantine.

In still another embodiment of the present invention, a SACS receives inputs from automated systems that determine the state of a subscriber and direct the SACS to act upon that state. By way of illustration and not as a limitation, a subscriber may be granted a maximum number of outbound e-mail messages over a time period (a "outbound message rate"). An outbound e-mail message counter monitors the subscriber outbound message rate and, if the measured outbound message rate exceeds the subscriber's allotted outbound message rate, the outbound e-mail message counter sends a message to the SACS to quarantine the CPE used by the subscriber. Further e-mail messages from the subscriber are directed to a mail-forwarding server that returns the e-mail message to the subscriber as "unsent" and provides the subscriber with an explanation as to the reason the subscriber's e-mail privileges have been suspended or otherwise altered. Additionally, the subscriber's CPE is quarantined and attempted access to the Internet is redirected to an enforcement server.

In another embodiment of the present invention, systems detect behavior indicative of the presence of a virus or a bug in cable system operator-provided software. In this embodiment, the CPE of affected subscribers is quarantined and the enforcement server is adapted to provide resources or patches so that the subscriber can take remedial action to correct the problem. In another embodiment of the present invention, the, the subscriber is required to demonstrate that the subscriber's CPE is virus or bug free. If the scan confirms the problem has been corrected, the subscriber reboots his or her CPE device(s) and the quarantine is lifted.

In still another embodiment of the present invention, a subscriber is quarantined in order to provide the subscriber with notification relating to the subscriber's service. In this embodiment, the subscriber is provided with a communication that requires the subscriber to acknowledge receipt and, if applicable, to agree with terms set forth in the notification. Upon acknowledgement by the subscriber and rebooting of the CPE, the quarantine is released.

In an embodiment of the present invention, a subscriber access control system (SACS) comprises a datastore comprising quarantine requests and a subscriber state (quarantined or unquarantined), a rules engine, a SACS proxy server, and a SACS DNS server. The rules engine acquires a quarantine request directed to a subscriber and determines a current subscriber state. A subscriber state comprises a quarantined state and an unquarantined state. The rules engine determines a desired subscriber state as indicated by the quarantine request. If the current subscriber state is unquarantined and the desired subscriber state is quarantined, the rules engine creates a quarantine attribute associated with a desired behavior of a network device of the subscriber and adds the quarantine attribute to a configuration record associated with the network device. If the current subscriber state is quarantined and the desired subscriber state is unquarantined, the quarantine attribute is removed from the quarantined configuration record and the subscriber state is returned to the unquarantined state.

The SACS proxy server receives a DNS request from the network device for the IP address of a Web site and determines the current subscriber state. If the current subscriber state is unquarantined, the DNS request is redirected to an external DNS server. If the current subscriber state is quarantined, the DNS request is forwarded to the SACS DNS server. The SACS DNS server responds to the DNS request with the IP address of a SACS web server. The SACS DNS server receives a GET request from the network device. The destination address of the GET request is the IP address of the SACS Web server. The SACS DNS server redirects the GET request to a URL of an enforcement server. A query string is embedded in the URL of the enforcement server. The query string comprises a quarantine reason code associated with a reason the subscriber state is quarantined and a procedure for changing the subscriber state to unquarantined. Optionally, the quarantine reason code is encrypted.

In another embodiment of the present invention, the configuration record is an LDAP record accessible to a dynamic host configuration protocol (DHCP) server. In an exemplary embodiment, the network device comprises customer premises equipment connected to a cable network via a cable modem. By way of illustration and not as a limitation, customer premises equipment may be a media terminal adapter, a computer, a router, a wireless access point, a firewall, and a network address translation server. In this exemplary embodiment, a first desired behavior comprises directing a DNS query to an IP address of a SACS DNS proxy server. The quarantine attribute comprises a DHCP option comprising attribute values and the first desired behavior is associated with a first attribute value. A second desired behavior associated with a second attribute value comprises only sending packets to IP addresses identified in an upstream filter set and only receiving packets from IP addresses identified in a downstream filter set.

In still another embodiment of the present invention, if the current subscriber state is unquarantined and the desired subscriber state is quarantined, the rules engine creates a first quarantine attribute associated with a first behavior and adds it to the configuration record. The rules engine determines whether the network device has acquired the first quarantine attribute. If the subscriber device has acquired the first quarantine attribute, the rules engine creates a second quarantine attribute and adds it to the configuration record. In this embodiment, the first desired behavior comprises directing a DNS query to an IP address of a SACS DNS proxy server and the second desired behavior comprises only sending packets to IP addresses identified in an upstream filter set and only receiving packets from IP addresses identified in a downstream filter set.

Another embodiment provides a method for affecting the behavior of a network device. A quarantine request directed to the network device of a subscriber is acquired. A current state of the subscriber is determined, wherein a subscriber state comprises a quarantined state and an unquarantined state. A desired subscriber state as indicated by the quarantine request is determined. A configuration record associated with the network device is accessed. If the current subscriber state is unquarantined and the desired subscriber state is quarantined, then a quarantine attribute associated with a desired behavior of the network device is created. A quarantine attribute associated with the desired behavior is added to the configuration record, the network device is reconfigured using the quarantined configuration record.

In an embodiment of the present invention, the configuration record is modified by adding a quarantine attribute associated with directing all DNS queries to an IP address of a subscriber access control system. In still another embodiment of the present invention, the configuration record is modified by adding a quarantine attribute comprising a boot file identifier associated with selecting a quarantine boot file. In this embodiment, the network device is instructed to reboot, the quarantine boot file associated with the boot file identifier is acquired, and the network device is configured using the quarantine boot file. In an exemplary embodiment of the present invention, the quarantine boot file configures the network device to only send packets to IP addresses identified in an upstream filter set and to only receive packets from IP addresses identified in a downstream filter set. Optionally, the quarantine boot file is a dynamic boot file acquired from a dynamic trivial FTP server.

If the current subscriber state is quarantined and the desired subscriber state is unquarantined, the quarantined configuration record is modified by removing the quarantine attribute from the quarantined configuration record and reconfiguring the network device using the unquarantined configuration record to return the network device to an unquarantined state.

In still another embodiment of the present invention, if the current subscriber state is unquarantined and the desired subscriber state is quarantined, a first quarantine attribute associated with a first behavior is created and added to the configuration record. A determination is made whether the network device has acquired the first quarantine attribute. If the subscriber device has acquired the first quarantine attribute, a second quarantine attribute is created and added it to the configuration record. In this embodiment, the first desired behavior comprises directing a DNS query to an IP address of a SACS DNS proxy server and the second desired behavior comprises only sending packets to IP addresses identified in an upstream filter set and only receiving packets from IP addresses identified in a downstream filter set.

Another embodiment of the present invention provides a method for enforcing a quarantined state of a subscriber. A DNS request is received from a subscriber for a Web page address. The current subscriber state is determined. The subscriber state may be quarantined state or unquarantined. If the current subscriber state is unquarantined, then DNS request is redirected to a DNS server. If the current subscriber state is quarantined, then DNS request is responded to by providing the IP address of a SACS web server. A GET request is received from the subscriber. The destination address of the GET request is the IP address of the SACS web server. The GET request is redirected to a URL of an enforcement server. A query string is embedded in the URL of the enforcement server and the URL is sent to the enforcement server. The query string comprises a quarantine reason code associated with a reason the subscriber state is quarantined and a procedure for changing the subscriber state to unquarantined. Optionally, the quarantine reason code is encrypted.

Another embodiment of the present invention provides a method for affecting the behavior of a network device. A network device creates a renewal message requesting renewal of an IP address lease. The renewal message from the network device is directed through a cable modem to a cable modem termination system (CMTS). At the CMTS, the cable modem MAC address is inserted into the renewal message and the renewal message is sent to a lease management server. In an embodiment of the present invention, the lease management server is a DHCP server and the network device comprises customer premises equipment. By way of illustration and not as a limitation, customer premises equipment may be a media terminal adapter, a computer, a router, a wireless access point, a firewall, and a network address translation server.

At the lease management server, the presence of the cable modem MAC address is detected in the renewal message causing a lookup of a record associated with the network device. A behavior attribute of the network device is obtained from the record. The behavior attribute is applied to the network device to produce a desired behavior.

In an embodiment of the present invention, the behavior attribute is associated with a quarantine state. The behavior attribute is applied to the network device to redirect communications from the network device to a subscriber access control system.

DESCRIPTION OF THE DRAWINGS

FIG. 3 illustrates a DHCP LDAP schema for a CPE in a DOCSIS-compliant network according to an embodiment of the present invention.

FIG. 4 illustrates a flow of a behavior in a cable subscriber network using a SACS to manage network access.

FIGS. 5A and 5B illustrate a process by which network equipment associated with a subscriber is quarantined according to embodiments of the present invention.

FIG. 7 illustrates the process by Web queries from a quarantined CPE are redirected to an enforcement server according to embodiments of the present invention.

DETAILED DESCRIPTION

The following terms are used in the description that follows. The definitions are provided for clarity of understanding:

CM—a cable modem.
CMTS—a CM termination system.
CPE—customer premises equipment.
DHCP—a dynamic host configuration protocol.
DNS—domain name service.
DOCSIS—"Data Over Cable Service Interface Specification" issued by Cable Television Laboratories, Inc.
ISP—an Internet service provider (ISP).
IP—Internet protocol.
IP address—An address assigned to a device in accordance with the Internet protocol.
LDAP—Lightweight Directory Access Protocol; used as the primary datastore for DOCSIS configuration information.
MAC address—the media access controller address of a network device.
Quarantine—affecting the behavior of a cable network device by dynamically changing its configuration.
SACS—subscriber access control system.
SOAP—simple object access protocol.

An embodiment of the present invention uses a subscriber access control system (SACS) to isolate a network device connected to cable network and to affect the behavior of that device. The SACS comprises a rules server and a datastore that stores the current state of subscribers known to the SACS and historical request information. When the SACS receives a request to quarantine a device, the SACS obtains the MAC address and IP of the device to be quarantined and then assigns attributes to a subscriber record accessed by a DHCP server to affect the behavior of that device. The actual behavior of the quarantined device is determined by the presence of the attribute and the value of the attribute.

In an exemplary embodiment of the present invention, a network device is quarantined (or isolated) from all or a portion of a cable network. In this exemplary embodiment, the behavior of the quarantined device is modified to direct communications from the device to an enforcement server. A subscriber using the quarantined network device is presented with the reasons for the quarantine and the steps necessary to release the subscriber's network equipment from quarantine.

Figure 1:
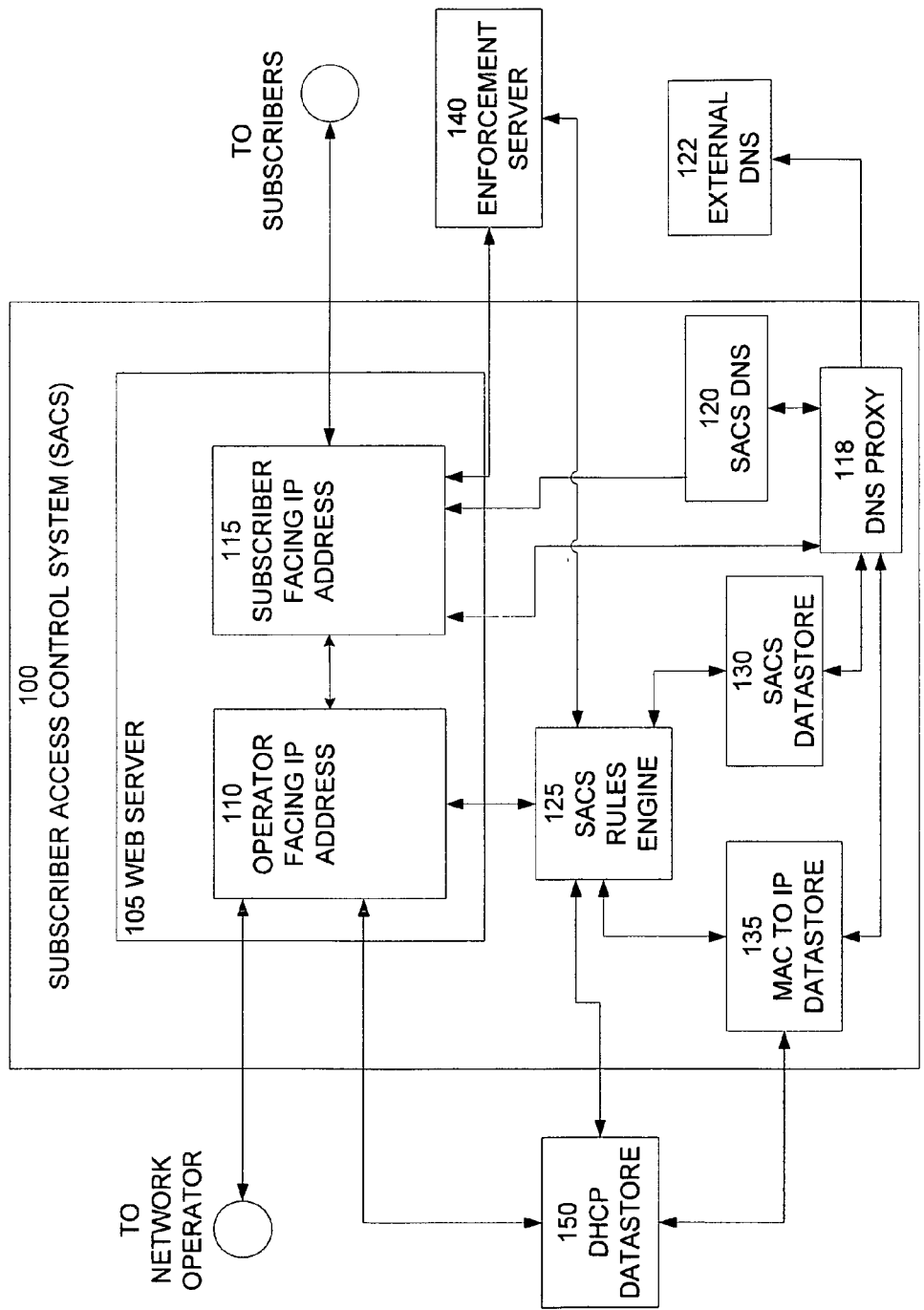
FIG. 1 illustrates a subscriber access control system according to an embodiment of the present invention.

FIG. 1 illustrates a subscriber access control system according to an embodiment of the present invention. A SACS 100 comprises a web server 105. The web server 105 comprises operator-facing IP address 110 and subscriber-facing IP address 115. The SACS 100 also comprises a SACS DNS proxy server 118 and a SACS DNS server 120. The SACS DNS proxy server 118 determines whether or not a subscriber is quarantined. If the subscriber device is not quarantined, the DNS proxy server 118 redirects the DNS queries to an "external" DNS server 122. If a subscriber device is quarantined, the DNS proxy server 118 refers the DNS query to the SACS DNS server 120 that responds with the SACS server IP address for all queries. In addition, the SACS 100 comprises a SACS rules engine 125 that processes quarantine requests and makes changes to the DHCP datastore LDAP entries (not shown), queries the MAC to IP datastore 135, and resets subscriber CPE to forced loading of the SACS-specific DOCSIS configuration files in the CM. A SACS datastore 130 stores the current state of subscribers known by the SACS system. A MAC-To-IP datastore 135 collects and stores MAC and IP correlation information, including the renewal status of an IP address lease.

The SACS web server 105 is responsible for a number of tasks. It provides an administrative interface for managing the quarantine state of known subscribers, offers a SOAP interface to submit quarantine and remove-quarantine messages, and also redirects quarantined subscribers to an enforcement server 140.

To differentiate the operator-facing IP address 110 and the subscriber-facing IP address 115 a virtual host configuration is used. The operator-facing IP address 110 and SOAP messaging components are provided by one virtual host and the subscriber-facing IP address is 115 is provided by another virtual host.

As previously noted and described in detail below, a quarantined device is configured such that all DNS requests are directed to the subscriber facing IP address 115 of the SACS web server 105. The DNS request is processed by the SACS DNS proxy server 118 to determine whether a subscriber device is quarantined. The SACS DNS proxy server 118 uses the SACS datastore 130 and the MAC to IP datastore 135 to determine the CM MAC address of the incoming DNS request. The CM MAC address is then used to look up the subscriber's state (quarantined or unquarantined) in the SACS datastore. If the subscriber's state is "unquarantined", the DNS proxy server 118 redirects the DNS queries to an "external" DNS server 122. If a subscriber's state is "quarantined", the DNS proxy server 118 refers the DNS query to the SACS DNS server 120 that responds with the SACS Web server 105 IP address for all queries. When the SACS DNS proxy server 118 determines where to send a subscriber's queries, it then caches the result of that decision. The cached decision is stored for a predetermined time period so as to remove the need for a MAC to IP and VACS datastore lookup for each request. In an embodiment of the present invention, the predetermined time is five minutes.

Whenever the SACS rules engine 125 changes the state of a subscriber it sends a notification message to the SACS DNS proxy server 118 informing it to clear any cached state relevant to that subscriber. This allows the SACS DNS proxy server 118 to immediately begin returning different results to the subscriber whenever his or her quarantine state changes.

DNS queries from quarantined devices are answered by the SACS DNS server 120 with the subscriber-facing IP address 115. The subscriber's browser uses this IP address as the destination address to perform a web query. Upon receipt of this query, the SACS web server 105 performs a MAC-to-IP lookup in the MAC-to-IP datastore 135 using the IP address of the CPE to obtain the MAC address of the subscriber's CM. The subscriber's CM MAC address is then used to ascertain the state of the subscriber's service. If the subscriber is quarantined, the SACS web server 105 captures additional subscriber information and the reasons for the quarantined state, then issues a redirect message to an enforcement server 140.

In an embodiment of the present invention, the URL of the redirect message comprises a query string. In this embodiment, the query string comprises the following pieces of information that are interpreted by the enforcement server and used to provide information to the customer:

SACS_server: The IP address of the SACS server (primary, non-subscriber facing virtual host)—used by the enforcement server to send messages back to the SACS server.

mac: the MAC address of the CM associated with the quarantined subscriber.

div: The division that the quarantined customer belongs to (populated from the subscriber's "docsissite" attribute in LDAP).

reason_code: Comma delimited list of reason codes for which the subscriber is currently quarantined.

The string "NONE" if the subscriber is not quarantined, or "SACS-ERROR" if an error occurred while contacting MAC to IP or the SACS database.

In an embodiment of the present invention, reason codes are encrypted to prevent them from being viewed or modified by the quarantined subscriber. They are only provided as a reference of the information that is provided to the enforcement server. The encrypted query string is also Base64 encoded so that it can be transmitted as part of the URL.

The SACS DNS server 120 is adapted to resolve the IP address of the enforcement server 140. In another embodiment of the present invention, the SACS DNS server 120 comprises a list of domain names it is permitted to resolve. By way of illustration and not as a limitation, the list may comprise the domain name of an enforcement server, a validation server, a virus scan server, and a service upgrade server.

The SACS rules engine 125 comprises instructions that perform the requested quarantine operations. The SACS rules engine 125 performs a number of specific functions of the SACS process. By way of illustration and not as a limitation, the SACS rules engine 125 is responsible for:

scanning the pending request table in the SACS datastore 130 and processing quarantine requests.

sending status notifications related to a subscriber quarantine state when a quarantine request has been processed.

promoting subscribers from DNS quarantine to DNS and modem quarantine after querying the MAC-to-IP server and validating that all CPEs have renewed their leases since a DNS quarantine was imposed. In an embodiment of the present invention, promotion of a subscriber from DNS to DNS and modem quarantine is subject to a predetermined time delay so as to provide an opportunity for a device that receives an IP address lease from a quarantined CPE to have renewed its CPE-issued lease.

validating the current subscriber state against the subscriber state as reflected in the SACS datastore 130. If a subscriber has been removed from quarantine without going through SACS, the SACS engine 125 updates the subscriber state in the SACS datastore 130 accordingly.

removing requests and subscriber records that have not been modified within a fixed time.

obtaining the current reason code list from the enforcement server 140.

providing data to allow the enforcement server to generate the content of a web page to be presented to the subscriber on the enforcement server 140.

forward change of state records from regional server to a central server.

The SACS datastore 130 stores the current state of subscribers known by the SACS system. SACS uses the SACS datastore 130 to track quarantine and remove-quarantine requests, subscriber state, and reason code information.

The MAC-to-IP datastore 135 is populated through notifications sent from each DHCP server (not illustrated) that services the cable network in which the SACS 100 is located. A DHCP server sends a notification record to the MAC-to-IP datastore 135 whenever the DHCP server issues or renews an IP address lease. The MAC-to-IP datastore 135 then processes the notification packet and stores the current information.

In an embodiment of the present invention, a SACS system is used to manage a cable network. The behavior of the cable network components is determined by a number of processes, including the process by which CMs and CPE are configured.

Figure 2:
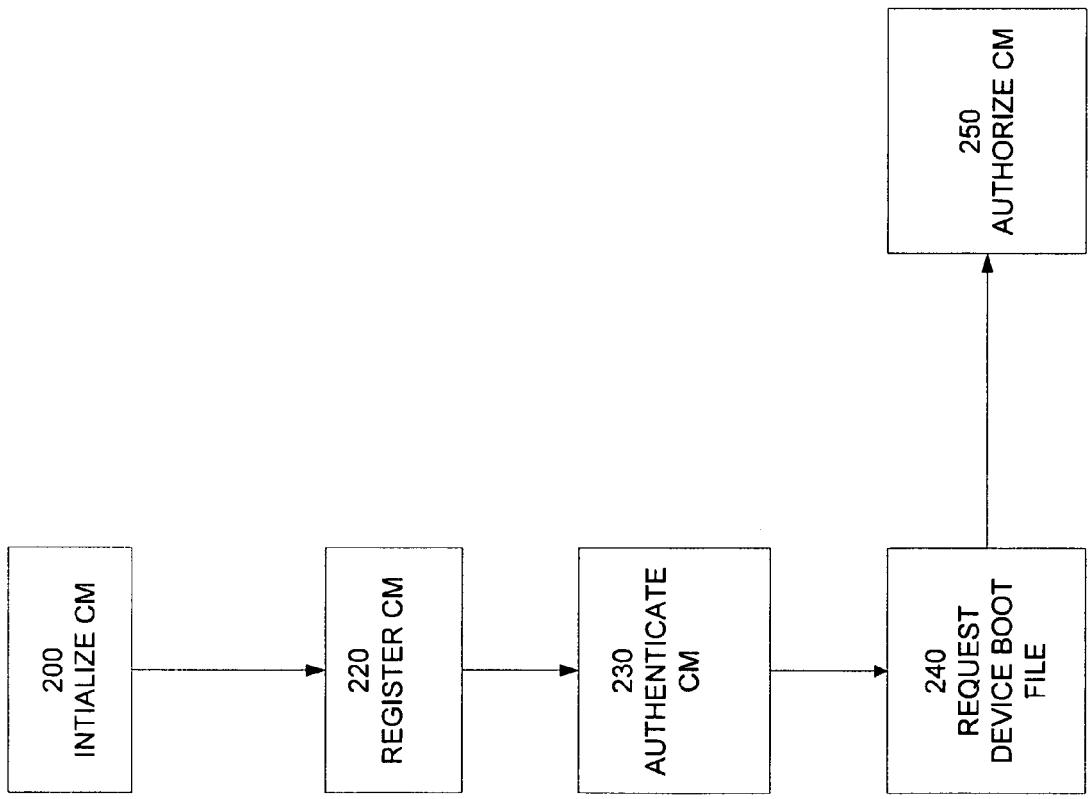
FIG. 2 illustrates the provisioning of a CM connected a single computer (CPE) according to process known in the art.

FIG. 2 illustrates the provisioning of a CM connected to a single computer (CPE) according to a process known in the art. Referring to FIG. 2, each time a CM is powered-on or reset, it must be initialized 200 through a series of "handshakes" and transfers of data between itself and a CM termination system (CMTS) at the cable headend. The next provisioning step is registration 220, where the CM is configured as an Internet device. During this process, the CM synchronizes its clock with a Time Of Day server and obtains IP addresses for the CM from a DHCP server. Following initialization, the CM is then authenticated 230 to confirm that the CM is entitled to receive service. The DHCP server also provides the CM the network address of a Dynamic Trivial File Transfer Protocol (DTFTP) server (as described in U.S. application Ser. No. 10/619,236) and the location where a device boot (or configuration) file for that modem can be found and downloaded.

The CM requests its device boot file 240 by the sending the DTFTP server a request message comprising a device boot file filename. The boot file comprises information regarding the service level of the subscriber, the subscriber's Internet service provider, and, if desired, IP filters that determine addresses that the CM may or may not access. As will be described below, the IP filters are modified by embodiments of the present invention to control behaviors of CPE that are quarantined.

Upon receipt of the boot file, the CM sends a registration request (REG-REQ) to the CMTS. This REG-REQ includes the current service identification (SID), CM IP address, operational parameters, upstream and downstream channel IDs, time stamps, and other configuration settings. If the information is accepted, the CMTS responds with a new SID and completes the registration process 250.

After a cable modem comes online, the CPE behind the cable modem tries to obtain an IP address using the DHCP process. The CPE typically sends a DHCP Request with the DHCP option set to DHCP DISCOVER, a source IP address of 0.0.0.0, and a destination IP address of 255.255.255.255. This packet is then relayed to the DHCP server by the cable modem termination system (CMTS). The relayed packet has the source IP address of the secondary IP address configured on the cable interface, and has the destination IP address of the DHCP server. The DHCP server responds with a DHCP OFFER with a number of options, including "Client server-assigned IP address". This is relayed back to the CPE by the CMTS. The CPE then sends a DHCP REQUEST for the assigned IP address. The response is a DHCP ACK from the server and from the CPE using the IP address being assigned.

As noted above, the DHCP server assigns IP addresses to the CM and the CPE connected to the CM as well as passes configuration information to hosts on a TCP/IP network.

Configuration parameters and other control information are carried in tagged data items that are stored in the options field of the DHCP message. The data items are also called options.

When assigning CPE IP address, the DHCP server consults its LDAP datastore to find configuration information for a device based on its MAC address. If the database comprises a specific entry for the network device, the server returns the information from the LDAP entry. If no entry exists for the network device, the server chooses the next IP address from the pool and assigns the address to the network device.

IP addresses assigned to CPE are not permanent. Instead, the DHCP server issues a lease on the address for a finite period of time. (When the administrator establishes a pool of addresses for DHCP to assign, the administrator must also specify the length of the lease for each address.) When the lease expires, the CPE must renegotiate with DHCP server to extend the lease (in the form of a RENEW Message). Normally, the DHCP server will approve a lease extension.

The DHCP protocol has two steps: one in which the CPE broadcasts a DHCP DISCOVER message to find a DHCP server, and another in which the CPE selects one of the servers that responded to its message and sends a request to that server. To avoid having a network device repeat both steps each time it boots or each time it needs to extend the lease, DHCP typically uses caching. When a CPE discovers a DHCP server, the network device saves the DHCP server's address in memory. When a CPE renews its lease, it uses DHCP server IP address to revalidate its former address. Doing so saves time and reduces network traffic.

In a typical cable subscriber network, a DHCP server will not look up a device's data in the LDAP datastore used by the DHCP when an IP address lease renewal request is made. In an embodiment of the present invention, the behavior of the DHCP server is modified to force all DHCP requests (DISCOVER and RENEW) to initiate a lookup in the LDAP datastore. This ensures that the quarantine state of the device is checked during each DHCP query (whether a DISCOVER or RENEW).

In this embodiment, the DHCP server response sets the "dhcp-server-identifier" option to the IP address of the CMTS that serves the CPE sending a DHCP DISCOVER message. RENEW requests sent by the CPE are then directed to the CMTS IP address as indicated in the dhcp-server-identifier. The CMTS inserts the MAC address of the CPE into the request and forwards the RENEW to the DHCP server. The presence of the MAC address in the RENEW causes the DHCP server to perform a look-up in the LDAP datastore used by that DHCP server. By modifying the LDAP record of a device in the LDAP datastore (that is, by adding or changing LDAP attributes) the behavior of the CPE can be adjusted by making changes to the schema for that device in the DHCP datastore.

In an embodiment of the present invention, the LDAP datastore accessed by the DHCP server comprises an additional attribute that identifies whether a CPE associated with a subscriber has been quarantined. FIG. 3 illustrates a LDAP schema for a CPE in a DOCSIS-compliant network according to an embodiment of the present invention. Referring to FIG. 3, a DHCP LDAP schema 300 comprises additional LDAP class quarantinable 305. Class quarantinable 305 comprises attribute quarantined 310. Attribute quarantined 310 is used to track a subscriber's quarantine state. To place a subscriber's CPE in quarantine, attribute quarantined 310 is set to the string value of either "dns" or "dnsmodem." When the subscriber is later removed from quarantine, the LDAP class quarantinable 305 and the attribute quarantined 310 are removed to reflect the change in state of the CPE device from "quarantined" to "not quarantined." The attribute and class names noted herein are entirely arbitrary and are not to be interpreted as limiting in any way.

As described in the discussion relating to FIG. 1, the SACS rules engine 125 processes quarantine requests and makes changes to the DHCP datastore LDAP entries.

FIG. 4 illustrates a flow of a behavior in a cable subscriber network using a SACS to manage network access. Referring to FIG. 4, a CPE is powered on and sends a DHCP RENEW request to a CMTS to which the CPE is connected 400. The CPE has previously acquired the IP address of the CMTS from a response received from a DHCP DISCOVER message. The CMTS adds the CM MAC address to the RENEW request and forwards the DHCP renewal request to the DHCP server 405 associated with the CPE. The DHCP server performs a client lookup 410 and checks for the presence of the attribute quarantine 415. If the quarantine LDAP attribute is not present, the process continues with the issuance of a DHCP response comprising an IP address renewal and a network DNS server address 420. If the quarantined LDAP attribute is present, the attribute value is checked to determine whether the value is either "dns" or "dnsmodem" 425. If the attribute value neither "dns" nor "dnsmodem," the value is ignored and the process continues with the issuance of an IP address and a network DNS address 420. If the attribute exists and the value is "dns", the DHCP server assigns the domain-name-server IP address option the value of the IP of the SACS 430. If the value is "dnsmodem," the DHCP server assigns the domain-name-server IP address option the value of the IP of the SACS 430 and also generates a CM configuration file name using the ISP code "SACS" 435. The SACS resets the CM using an SNMP message causing it to "reboot" and to load a SACS-specific configuration file 440. The SACS configuration file comprises IP filters that establish the IP addresses to which the CM may send, and from which the CM may receive, messages.

In an alternative embodiment of the present invention, a determination is first made whether the subscriber is configured to receive VoIP telephone service and, if so configured, whether a subscriber call is in progress. If a call is in progress, the subscriber's modem is not rebooted until the call is terminated. Similarly, a subscriber may be configured to receive other multimedia services via an MTA. Prior to rebooting the subscriber's CM, a determination is made whether a multimedia session is in progress. If so, the reboot message is delayed until the multimedia session is completed.

In another embodiment of the present invention, the SACS engine is adapted to only apply the SACS configuration file to non-voice subscribers after it has validated that all CPE's behind the modem have renewed their DHCP leases since the DNS quarantine was put in place. This validation insures that the CM only has IP filters after the CPE has been configured with the SACS DNS server IP address.

In yet another embodiment of the present invention, the quarantine attribute value is not set to "dnsmodem" until after a predetermined time period to allow a device that receives its IP address lease from a quarantined CPE to renew that lease and to acquire the IP address of the SACS DNS server. If the CM modem were to acquire upstream and downstream filters before a device behind a quarantined CPE acquired the IP address of the SACS DNS server, all DNS queries from the device would fail. Delaying the change of the attribute value to "dnsmodem" increases the likelihood that a device behind a quarantined CPE will have renewed the lease it receives from the quarantined CPE. In an exemplary embodiment of the present invention, the predetermined time period is twenty-four hours.

As previously discussed, network equipment is quarantined in two stages. Both stages are indicated by the presence of a value for the quarantined attribute in the subscriber's LDAP entry. The first stage is DNS only quarantine, in which all CPE behind the subscriber's modem are given an alternate DNS server that responds with the rules server's IP address for any query. Until all of CPE has been reconfigured, the SACS engine will not invoke the second stage. The second stage is DNS and modem quarantine, where in addition to the DNS stage the subscriber's CM is also given a SACS specific DOCSIS configuration file. This configuration file comprises IP filters that only allow IP traffic to and from designated network devices such as DHCP servers, rules server, and enforcement servers.

Figure 5A:
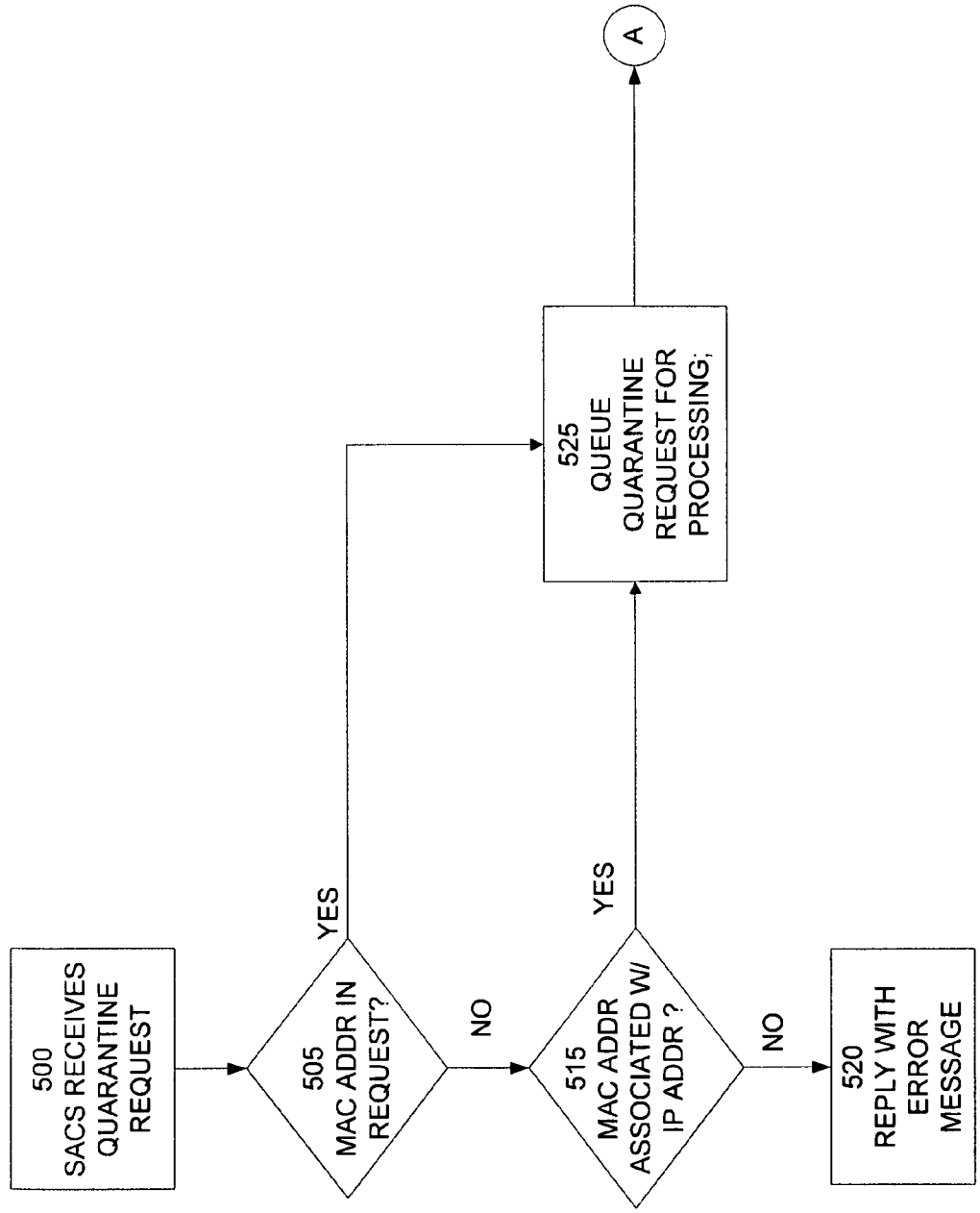

FIGS. 5A and 5B illustrate a process by which network equipment associated with a subscriber is quarantined according to embodiments of the present invention. Referring to FIG. 5A, the SACS receives a quarantine request 500. In another embodiment of the present invention, the SACS engine periodically polls its datastore for requests that have yet to be processed. Priority is given to remove-quarantine requests so that remove-quarantine requests are processed before quarantines. When instructed to quarantine a subscriber, the SACS interface first attempts to identify the cable modem associated with the subscriber based upon the information provided with the quarantine request 505. If the MAC address is provided in the quarantine request, the request is queued for processing. If the MAC address is not provided in the quarantine request, the CPE IP address is used to query the MAC-to-IP datastore to determine whether a CM MAC address is associated with the CPE IP address 515. If a CM MAC address cannot be found, the SACS engine replies with an error message and does not queue the quarantine request 520. If a MAC address is found based upon the MAC-to-IP query, the SACS interface queues the quarantine request for processing by the SACS engine 525.

Referring to FIG. 5B, the current state of the subscriber is determined by performing a look-up in the SACS datastore using the CM MAC address 528. The requested state and the associated reason code are determined 530 from the quarantine request. If the requested state is "quarantined" a determination is made whether the current state is "unquarantined" 535.

If the current state is not "unquarantined," (that is, the current state is "quarantined"), then a determination is made whether the reason code has been previously associated with the state "quarantined" 540. If the reason code is not "new," the process ends 545. If the reason code is "new", or if the current state is "unquarantined", the reason code is associated with the quarantined status 550. Additionally, if the current state is "unquarantined", then the CM MAC address is searched in a LDAP datastore 560 accessible to the DHCP server. If no record matching the CM MAC address is found, an error message is generated 565. If a record is associated with the CM MAC address, the SACS engine adds a quarantine attribute to the LDAP file of the subscriber accessible to the DHCP server associated with the quarantined network device and sets the value to "dns" 570. The "dns" value causes the DHCP server to assign the domain-name-server IP address option the value of the IP address of the SACS DNS proxy server. This value is received by the quarantined CPE when it renews its lease. However, a device behind the quarantined CPE may receive its IP address and leases from the quarantined CPE and will not receive the DNS/SACS IP address until it renews its lease with the quarantined CPE.

The second stage of the quarantine process is DNS and modem quarantine, where in addition to the DNS stage the subscriber's CM is also given a SACS specific DOCSIS configuration file. This configuration file comprises IP filters that only allow IP traffic to and from designated network devices such as DHCP servers, rules server, and enforcement servers. This stage is dependent upon completion of the first stage, which in turn is completed when each CPE behind a cable modem has renewed its IP address lease. Referring again to FIG. 5A, a determination is made whether all quarantined CPE has renewed its lease 575. This determination is made by periodically checking the MAC to IP datastore where lease renewal information is maintained. If all of the CPE associated with a cable modem has been reconfigured, the SACS engine sets the quarantine attribute value to "dnsmodem" 580.

In an embodiment of the present invention, the quarantine attribute value is not set to "dnsmodem" until after a predetermined time period to allow a device that receives its IP address lease from a quarantined CPE to renew that lease and to acquire the IP address of the SACS DNS server. If the CM modem were to acquire upstream and downstream filters before a device behind a quarantined CPE acquired the IP address of the SACS DNS server, all DNS queries from the device would fail. Delaying the change of the attribute value to "dnsmodem" increases the likelihood that a device behind a quarantined CPE will have renewed the lease it receives from the quarantined CPE. In an exemplary embodiment of the present invention, the predetermined time period is twenty-four hours.

Setting the quarantine attribute value to "dnsmodem" causes the DHCP server to generate a CM configuration file name using the ISP code "SACS". The SACS resets the CM by sending an SNMP reboot message 585 to the CM causing it to "reboot" and to load the SACS-specific configuration file. In an embodiment of the present invention, the SACS-specific configuration file comprises upstream and downstream filter definitions that limit the incoming and outgoing communications passing through the CM.

Figure 6:
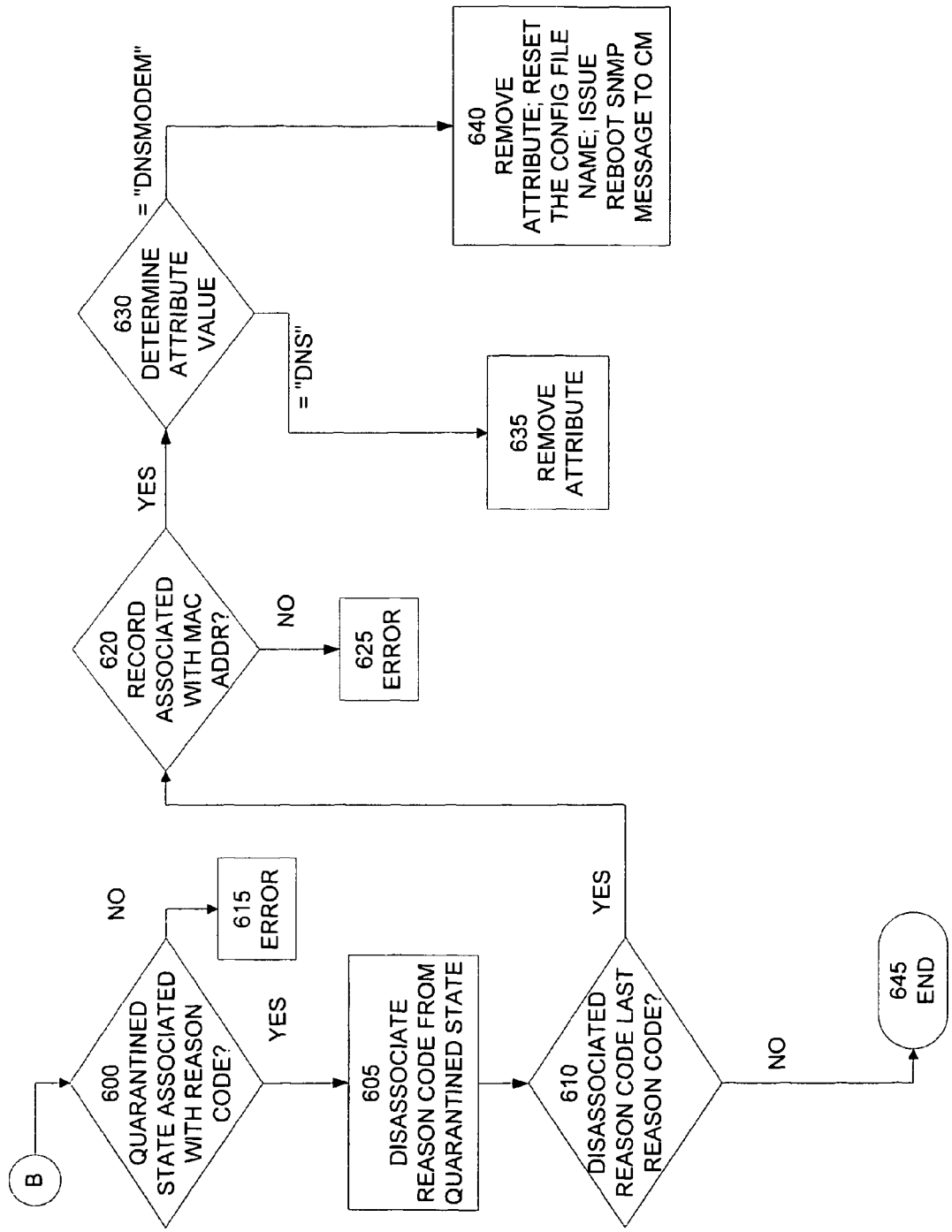
FIG. 6 illustrates a process by which network equipment associated with a subscriber is unquarantined according to embodiments of the present invention.

FIG. 6 illustrates a process by which network equipment associated with a subscriber is unquarantined according to embodiments of the present invention. Referring to FIGS. 5A, 5B and 6, The SACS server receives the unquarantine request 500 and queues it as previously described. The requested state is determined 530 to be "unquarantined." Referring to FIG. 6, a determination is made whether the current quarantine state is associated with the reason code included in the quarantine request (requesting a state of "unquarantined") 600. If the reason code in the quarantine request is not associated with the current "quarantined" state, an error message is generated 615. If the reason code in the quarantine request is associated with the current "quarantined" state, the quarantine state is disassociated with that reason code 605. A determination is made whether the disassociated reason code is the last reason code associated with the current quarantined state 610. If other reason codes remained associated with the current quarantined state, the process ends 645. If the disassociated reason code is the last reason code associated with the quarantined state, the CM MAC address is searched in a datastore 620 accessible to the DHCP server. If no record matching the CM MAC address is found, an error message is generated 625. If a record is associated with the CM MAC address, the SACS engine determines the value of the quarantine attribute 630. If the value of the quarantine attribute is "dns," the quarantine attribute is removed from the LDAP datastore 635 accessible to the DHCP server. If the value of the quarantine attribute is "dnsmodem," the quarantine attribute is removed from the LDAP datastore accessible to the DHCP server, the configuration file name is reset, and an SNMP reboot message is sent to the CM causing it to "reboot" 640. Rebooting the CM causes it load a new configuration file thereby removing the upstream and downstream filter definitions.

The unquarantine process does not require that a subscriber reboot CPE or devices behind CPE to remove the SACS DNS server address. As previously described, the SACS DNS proxy server 118 (FIG. 1) determines the state of a subscriber before redirecting DNS queries from a subscriber to either the SACS DNS server 120 or an external DNS server 122. A subscriber that has been "unquarantined" will be given access to an external DNS server even before the address of the SACS is removed from the configuration of a quarantined CPE or a device behind a quarantined CPE.

FIG. 7 illustrates the process by which Web queries from a quarantined CPE are redirected to an enforcement server according to embodiments of the present invention. Referring to FIG. 7, a quarantined CPE initiates a Web query from a browser. The browser creates a DNS request message that is received at the SACS 700. As described with respect to FIG. 4, the DNS request is directed to the SACS subscriber facing IP address of the SACS web server where a SACS DNS proxy server determines whether or not a subscriber is quarantined 705. The determination of whether a subscriber state is "quarantined" is made on the basis of data held in the SACS datastore. If the subscriber device is "unquarantined", the DNS proxy server redirects the DNS queries to an "external" DNS server 710 that processes the request. If a subscriber state is "quarantined", the DNS proxy server refers the DNS query to the SACS DNS server that responds with the SACS web server IP address for all queries 715. The DNS request is returned to the subscriber's browser. The browser then creates a Web query (a "GET" message) that is received at the web server IP address 720. The SACS web server captures additional subscriber information and the reasons for the quarantined state, then redirects the Web query to an enforcement server 725.

In an embodiment of the present invention, the redirect message comprises a query string. The query string comprises the following pieces of information that are interpreted by the enforcement server and used to provide information to the customer:

SACS_server: The IP address of the SACS server (primary, non-subscriber facing virtual host)—used by the enforcement server to send messages back to the SACS server.

mac: the MAC address of the CM associated with the quarantined subscriber.

div: The division that the quarantined customer belongs to (populated from the subscriber's "docsissite" attribute in LDAP).

reason_code: Comma delimited list of reason codes for which the subscriber is currently quarantined.

The string "NONE" if the subscriber is not quarantined, or "SACS-ERROR" if an error occurred while contacting MAC to IP or the SACS database.

In an embodiment of the present invention, reason codes are encrypted to prevent them from being viewed or modified by the quarantined subscriber. They are only provided as a reference of the information that is provided to the enforcement server. The encrypted query string is also Base64 encoded so that it can be transmitted as part of the URL.

A network device may be quarantined for any number of reasons simultaneously. The status record of a quarantined subscriber reflects each reason for quarantine applicable to the subscriber. In order for a subscriber state to change to "unquarantined," each reason for quarantine must be addressed. The SACS engine downloads a list of current reason codes from the enforcement server on a periodic basis. The download is through a SOAP function call that returns the reason code, a descriptive name, and it's current status (active or disabled). When SACS downloads the current reason codes from the enforcement server it synchronizes its reason code table with the central table maintained by the enforcement server. Any codes that are disabled will be marked as such in the local reason code table.

In an embodiment of the present invention, a quarantine or unquarantine request message comprises a reason code. As previously noted, a subscriber can be quarantined by SACS for multiple reason codes at once. If that is the case, unquarantine requests will be received for each of the reason codes before the subscriber is released from quarantine. If a reason code is disabled, SACS will not allow submission of new quarantine requests for that reason code. However, unquarantine requests will be permitted even if the reason code is disabled to permit reinstatement of subscribers who have been quarantined for the disabled reason code.

In another embodiment of the present invention, the SACS causes an external system to issue an e-mail message to a subscriber prior to quarantining. In this embodiment, the e-mail comprises a warning that quarantine will occur unless the subscriber takes specified actions.

A system and method for affecting the behavior of a network device in a cable network has now been described. It will also be understood by those skilled in the art that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for affecting the behavior of a network device, the network device comprising at least a processor and the method comprising:

creating at the network device a lease renewal request message requesting renewal of an IP address lease, wherein the network device is connected to a cable modem;

directing the renewal message from the network device through the cable modem to a cable modem termination system (CMTS);

inserting at the CMTS the cable modem MAC address into the renewal message;

sending the lease renewal request message to a dynamic host configuration protocol (DHCP) server from the CMTS;

accessing from the DHCP server a configuration record associated with the network device in response to the presence of the modem MAC address in the lease renewal request message;

determining by the DHCP server using the modem MAC address whether the configuration record comprises a quarantine attribute field;

determining an attribute value assigned to the quarantine attribute field when the quarantine attribute field is present in the configuration record;

renewing the lease of the network device and assigning an address of an external DNS server in a lease renewal response message when the quarantine attribute field is not present in the configuration record;

assigning an address of a quarantine DNS server to a DNS IP address option in a lease renewal response message when the attribute value is a first value; and sending the lease renewal response message to the network device through the cable modem, wherein in response to the lease response message, a DNS query sent from the network device is directed to the quarantine DNS server when the address of the quarantine DNS server is assigned in the lease renewal response message.

2. The method of claim 1, wherein the network device is a customer premises equipment connected to the cable modem.

3. The method of claim 2, wherein the customer premises equipment is selected from the group consisting of a media terminal adapter, a computer, a router, a wireless access point, a firewall, and a network address translation server.

4. The method of claim 1 further comprising:
instructing the cable modem to reboot so as to acquire a quarantine boot file when the attribute value is a second value; and
configuring the cable modem using the quarantine boot file.

5. The method of claim 4, wherein configuring the cable modem using the quarantine boot file comprises configuring the cable modem to permit the cable modem to only send packets to IP addresses identified in an upstream filter set and to only receive packets from IP addresses identified in a downstream filter set.

6. The method of claim 5, wherein the communication session is selected from the group consisting of a voice over IP session and a multimedia session.

7. The method of claim 1 further comprising:
determining when the cable modem is not engaged in a communication session when the attribute value is a second value;
instructing the cable modem to reboot so as to acquire a quarantine boot file when the cable modem is not engaged in a communication session; and
configuring the cable modem with the quarantine boot file.

8. The method of claim 1 further comprising:
acquiring a quarantine request directed to a subscriber;
determining a current state of the subscriber, wherein a subscriber state comprises a quarantined state and an unquarantined state;
determining a desired subscriber state as indicated by the quarantine request;
accessing the configuration record associated with the network device;
creating the quarantine attribute field and assigning the quarantine attribute field the attribute value associated with the desired subscriber state and adding the quarantine attribute field and the attribute value to the configuration record when the current subscriber state is unquarantined and the desired subscriber state is quarantined; and
removing the quarantine attribute value from the quarantined configuration record when the current subscriber state is quarantined and the desired subscriber state is unquarantined.

9. A system for affecting the behavior of a network device, the system comprising:
a cable modem termination system (CMTS);
a dynamic host configuration protocol (DHCP) server;
a network device, wherein the network device is connected to a cable modem, and wherein the cable modem cooperates with the CMTS via a network;

wherein the CMTS is configured for:
receiving a lease renewal request message from the network device via the cable modem;
inserting a cable modem MAC address into the lease renewal request message; and
sending the lease renewal request message to the DHCP server; and
wherein the DHCP server is configured for:
receiving the lease renewal request message from the CMTS;
accessing a configuration record associated with the network device in response to the presence of the cable modem MAC address;
determining using the modem MAC address whether the configuration record comprises a quarantine attribute field;
determining an attribute value assigned to the quarantine attribute field when the quarantine attribute field is present in the configuration record;
renewing the lease of the network device and assigning an address of an external DNS server in a lease renewal response message when the quarantine attribute field is not present in the configuration record;
assigning an address of a quarantine DNS server to a DNS IP address option in a lease renewal response message when the attribute value is a first value; and
sending the lease renewal response message to the network device through the cable modem,
wherein in response to the lease response message, a DNS query sent from the network device is directed to the quarantine DNS server when the address of the quarantine DNS server is assigned in the lease renewal response message.

10. The system of claim 9, wherein the customer premises equipment is selected from the group consisting of a media terminal adapter, a computer, a router, a wireless access point, a firewall, and a network address translation server.

11. The system of claim 9, wherein the lease management server is further configured for renewing the lease of the network device when the quarantine attribute field is not present in the configuration record.

12. The system of claim 9, wherein the attribute value of the network device is associated with a quarantine state of the network device, wherein the system further comprises a subscriber access control system, and wherein the subscriber access control system is configured for:
instructing the cable modem to reboot so as to acquire a quarantine boot file when the attribute value is a second value; and
configuring the cable modem using the quarantine boot file.

13. The system of claim 12, wherein the quarantine boot file comprises network filters which when configured on the cable modem cause the cable modem to only send packets to IP addresses identified in an upstream filter set and to only receive packets from IP addresses identified in a downstream filter set.

14. The system of claim 9, wherein the attribute value of the network device is associated with a quarantine state of the network device, wherein the system further comprises a subscriber access control system, and wherein the subscriber access control system is configured for:
determining when the cable modem is not engaged in a communication session when the attribute value is a second value;

instructing the cable modem to reboot so as to acquire a quarantine boot file when the cable modem is not engaged in a communication session; and configuring the cable modem with the quarantine boot file.

15. The system of claim 14, wherein the communication session is selected from the group consisting of a voice over IP session and a multimedia session.

16. The system of claim 9 further comprising a subscriber access control system and wherein the subscriber access control system is configured for:

acquiring a quarantine request directed to a subscriber;

determining a current state of the subscriber, wherein a subscriber state comprises a quarantined state and an unquarantined state;

determining a desired subscriber state as indicated by the quarantine request;

accessing a configuration record associated with the network device;

creating the quarantine attribute field and assigning the quarantine attribute field the attribute value associated with the desired subscriber state and adding the quarantine attribute field and the attribute value to the configuration record when the current subscriber state is unquarantined and the desired subscriber state is quarantined; and removing the quarantine attribute value from the quarantined configuration record when the current subscriber state is quarantined and the desired subscriber state is unquarantined.

* * * * *